Dec. 27, 1949     J. K. SNELL     2,492,769
RECEPTACLE MOUNTING AND CLOSURE FASTENER
Filed Feb. 16, 1949
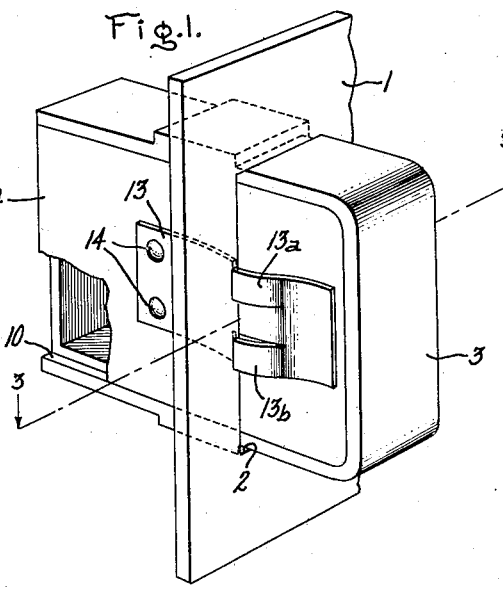
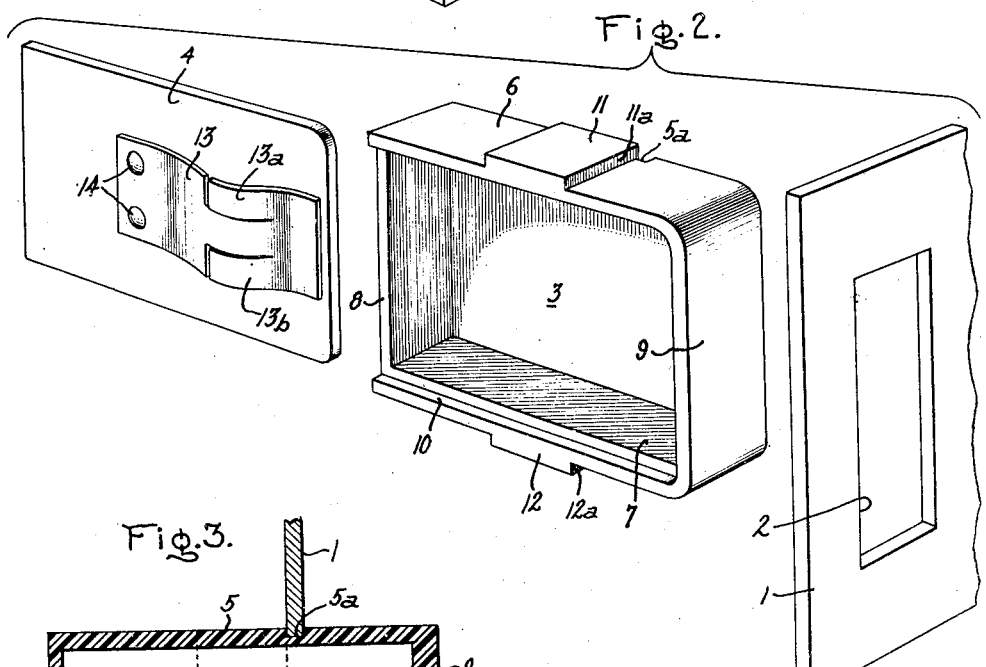
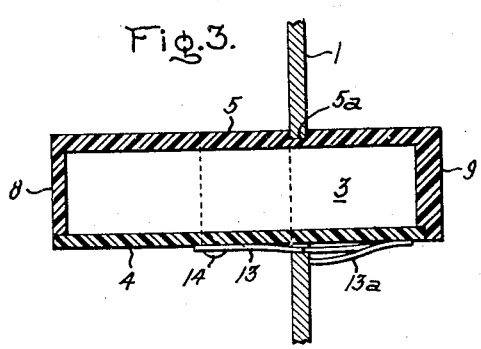
Inventor:
Jacob K. Snell,
by
His Attorney.

Patented Dec. 27, 1949

2,492,769

UNITED STATES PATENT OFFICE 2,492,769

RECEPTACLE MOUNTING AND CLOSURE FASTENER

Jacob K. Snell, Schenectady, N. Y., assignor to General Electric Company, a corporation of New York Application February 16, 1949, Serial No. 76,844

6 Claims. (Cl. 220—18)

My invention relates to combined receptacle mountings and closure fasteners, and is particularly adapted to the mounting of a receptacle or container for electric control apparatus on a control panel.

It is a general object of my invention to provide new and novel means for simultaneously holding a receptacle closure in place and mounting the receptacle itself upon a supporting panel.

It is a more particular object of my invention to provide a combined receptacle closure and receptacle mounting means which is inexpensive to manufacture, sturdy and reliable in operation, and simply and easily assembled and disassembled.

My invention itself, together with further objects and advantages thereof, will be more fully understood by referring now to the following detailed specification taken in conjunction with the accompanying drawing in which Fig. 1 is a perspective view of a receptacle and panel mounted in assembled relation in accordance with my invention; Fig. 2 is an exploded perspective view of the assembly shown at Fig. 1; and Fig. 3 is a cross sectional view taken along the line 3—3 of Fig. 1.

Referring now to the drawing, where I have shown a preferred embodiment of my invention by way of example, I provide a panel 1 having a rectangular aperture 2 therein adapted to receive and support a substantially rectangular receptacle or box 3. The panel 1 may, for example, be a control panel supporting various items of electrical apparatus, and may suitably be formed of any well known moulded insulating compound. Similarly, the receptacle or container 3 is adapted to contain any suitable electrical apparatus, or the like, and may suitably be formed of any well known moulded insulating compound or the like. It will be understood, of course, that my invention is not limited in its broader aspects to use with electrical apparatus, and is not limited to the use of parts made of insulating material.

The receptacle 3 is shown as a substantially rectangular box having a removable side wall or closure 4 and an oppositely disposed integral side wall 5. The receptacle 3 includes also a pair of intermediate side walls 6 and 7 and a pair of end walls 8 and 9, all integral with the side wall 5. The two side walls 6 and 7 and the front end wall 8 are provided with lips or flanges 10, thereby to form a trackway permitting rearward sliding movement of the closure 4 but preventing lateral or forward sliding movement thereof.

The receptacle 3 is adapted for interfitting sliding relation with the aperture 2 in the panel 1. The cross sectional dimensions of the receptacle are slightly smaller than the dimensions of the aperture to permit endwise sliding movement of the receptacle into the aperture. Movement of the receptacle 3 into the aperture 2 is limited by a pair of abutments 11 and 12 formed on the opposite side walls 6 and 7, respectively, and providing shoulders 11a and 12a, respectively, arranged to engage the back of the panel 1 and stop forward movement of the receptacle through the aperture 2. The integral side wall 5 is slotted transversely at 5a (Fig. 3) to fit over the panel 1 at one side of the aperture 2, the slot 5a being aligned with the shoulders 11a and 12a.

In order to hold the cover 4 in place on the receptacle 3 and to hold the entire receptacle in position on the panel 1, there is attached to the outside surface of the cover 4, a resilient spring clip 13. The spring clip 13 is formed as an arcuate leaf spring attached at one end to the side wall 4 by rivets 14 and slotted to provide a pair of resilient latching fingers 13a and 13b. The spring clip 13 is so disposed on the side wall 4 that it slides between the side wall and one side of the aperture 2, thereby to bias the entire receptacle for sidewise movement in the aperture to an assembled position with the slot 5a fitting over the panel 1 at the opposite side of the aperture 2. This biasing action is accomplished by the central integral leg of the spring strip. In this assembled position, the outer spring fingers 13a and 13b are just forward of the front surface of the panel 2 and spring outwardly, as shown at Fig. 3, to latch the receptacle and cover against withdrawal toward the rear of the panel.

In assembling my new and novel receptacle and mounting it on the panel 1 in accordance with my invention, the receptacle 3 (Fig. 2), preferably without the removable side wall 4, is moved forward into the aperture 2 in the panel 1 to the point where the abutments 10 and 11 engage the rear side of the panel. In this position, the slot 5a is aligned with the adjacent side of the aperture. The receptacle is next moved sidewise to bring the slot and panel into engaging relation, as shown at Fig. 3. With the open sided receptacle in this position, the removable side wall 4 is placed in the trackway between the lips 9 and slid into position against the front end wall 8 of the receptacle. In this movement, the side wall 4 and the spring clip 13 are slid through the aperture 2 with the spring clip 13 bearing against that side of the aperture opposite the slot 5a. In the fully closed position of the side wall 4, the latching spring fingers 13a and 13b are just forward of the panel 1 and spring outward, as at Fig. 3, to latch the receptacle and cover against withdrawal. In the assembled position, shown at Fig. 3, forward movement of the receptacle is prevented by the abutments 11 and 12, and backward movement of the receptacle is prevented by the spring fingers 13a and 13b and by engagement of the panel 1 with the slot 5a. To remove the receptacle 3 from the panel 1, it is only necessary to depress the latching spring fingers 13a and 13b and reverse the assembly procedure.

It will, of course, be appreciated that, if the aperture 2 is made slightly wider than the assembled receptacle 3, the side wall 4 may first be placed in position and the entire assembly then slipped into the panel. In this latter mode of assembly, the slightly wider dimensioning of the aperture is necessary to allow space for the spring clip 13 before the slot 5 is in engaging position.

While I have illustrated and described only a preferred embodiment of my invention by way of illustration, many modifications will occur to those skilled in the art, and I, therefore, wish to have it understood that I intend in the appended claims to cover all such modifications as fall within the true spirit and scope of my invention.

What I claim as new and desire to secure by Letters Patent of the United States is:

1. In combination, a panel having an aperture therein, a receptacle adapted to be mounted in said aperture and having a pair of oppositely disposed side walls, one said side wall being slotted to fit over said panel at one side of said aperture and the other said side wall being slidable in a direction perpendicular to the length of said slot, said aperture permitting endwise insertion of said receptacle thereinto and subsequent sidewise movement of said receptacle to a position of engagement of said slot and panel, and resilient means mounted on said slidable side wall for engagement with said panel to bias said receptacle to said position of slot engagement.

2. In combination, a panel having a substantially rectangular aperture therein, a receptacle adapted to be mounted in said aperture and supported by said panel, said receptacle having a pair of oppositely disposed side walls and a cross sectional configuration dimensioned for interfitting sliding relation with said aperture, one said side wall being slotted to fit over said panel at one side of said aperture and the other said side wall being slidably mounted on said receptacle for movement substantially perpendicular to the length of said slot, and a spring clip mounted on said slidable side wall for engagement with said panel at the other side of said aperture to bias said receptacle for sidewise movement to a position of engagement of said slot and panel.

3. In combination, a panel having an aperture therein, a receptacle adapted to be mounted in said aperture and supported by said panel, said receptacle having a pair of oppositely disposed side walls and a cross sectional configuration dimensioned for interfitting relation with said aperture, one said side wall being slotted to fit over said panel at one side of said aperture and the other said side wall being slidably mounted on said receptacle for movement substantially perpendicular to the length of said slot, and a spring clip mounted on said slidable side wall for engagement with said panel at the other side of said aperture to bias said receptacle for sidewise movement to a position of engagement of said slot and panel, said spring clip being slidable through said aperture as said side wall is slidably moved into assembled position and including a spring finger biased to a position of engagement with said panel to latch said slidable side wall in said assembled position.

4. In combination, a panel having an aperture therein, a receptacle adapted to be mounted in said aperture and supported by said panel, said receptacle having a pair of oppositely disposed side walls and a cross sectional configuration dimensioned for interfitting relation with said aperture, one said side wall being slotted to fit over said panel at one side of said aperture and the other said side wall being slidably mounted on said receptacle for movement substantially perpendicular to the length of said slot, a spring clip mounted on said slidable side wall for engagement with said panel at the other side of said aperture to bias said receptacle for sidewise movement to a position of engagement of said slot and panel, and latching means mounted on said slidable side wall and engaging said panel to maintain said slidable side wall in assembled position.

5. In combination, a panel having a substantially rectangular aperture therein, a substantially rectangular receptacle adapted to be mounted in said aperture and supported by said panel, said receptacle having a pair of oppositely disposed side walls and a cross sectional configuration dimensioned for interfitting relation with said aperture, one said side wall being removable and said receptacle having edge flanges on three sides interfitting with said removable wall to permit slidable removal of said wall in one direction only, the other said side wall being slotted in a direction substantially perpendicular to the direction of sliding movement of said removable wall, spring means mounted on the outside of said removable side wall for engagement with said panel at one side of said aperture to bias said receptacle for sidewise movement to an assembled position with said slot fitting over said panel at the opposite side of said aperture, and latching means mounted on said removable side wall and arranged to engage said panel to retain said removable wall and said receptacle in assembled position on said panel.

6. In combination, a panel having a substantially rectangular aperture therein, a substantially rectangular receptacle adapted to be mounted in said aperture and supported by said panel, said receptacle having two pairs of oppositely disposed side walls and a cross sectional configuration dimensioned for interfitting relation with said aperture, one of said side walls being transversely slotted to fit over said panel at one side of said aperture and the opposite side wall being slidably mounted on said receptacle for endwise removal in one direction only, an abutment on each intermediate side wall to limit movement of said receptacle into said aperture, said abutments being positioned to align said slot with one side of said aperture, and spring means interposed between said removable side wall and the other side of said aperture to bias said receptacle for sidewise movement into an assembled position of engagement between said slot and panel.

JACOB K. SNELL.

No references cited.